United States Patent
Rice et al.

(10) Patent No.: US 9,636,757 B1
(45) Date of Patent: May 2, 2017

(54) GOLF CLUB HEAD WITH FACE GROOVES AND TEXTURING

(71) Applicant: CALLAWAY GOLF COMPANY, Carlsbad, CA (US)

(72) Inventors: Bradley C. Rice, Carlsbad, CA (US); Esteban Aguilar, Carlsbad, CA (US); Irina Ivanova, San Marcos, CA (US)

(73) Assignee: Callaway Golf Company, Carlsbad, CA (US)

( * ) Notice: Subject to any disclaimer, the term of this patent is extended or adjusted under 35 U.S.C. 154(b) by 303 days.

(21) Appl. No.: 14/547,027

(22) Filed: Nov. 18, 2014

Related U.S. Application Data

(60) Provisional application No. 62/053,879, filed on Sep. 23, 2014.

(51) Int. Cl.
*A63B 53/04* (2015.01)
*B23C 3/30* (2006.01)
*B23C 5/02* (2006.01)

(52) U.S. Cl.
CPC .............. *B23C 3/30* (2013.01); *A63B 53/047* (2013.01); *B23C 5/02* (2013.01); *A63B 2053/0445* (2013.01); *B23C 2210/24* (2013.01); *B23C 2210/54* (2013.01); *B23C 2220/36* (2013.01)

(58) Field of Classification Search
USPC .................. 473/287–292, 324–350, 409
See application file for complete search history.

(56) References Cited

U.S. PATENT DOCUMENTS

| | | | |
|---|---|---|---|
| 5,437,088 A | 8/1995 | Igarashi | |
| 5,591,092 A | 1/1997 | Gilbert | |
| 7,014,568 B2 | 3/2006 | Pelz | |
| 7,273,422 B2 | 9/2007 | Vokey et al. | |
| 7,278,928 B2 | 10/2007 | Newman | |
| 7,594,863 B2 * | 9/2009 | Ban | A63B 53/047 473/331 |
| 7,653,980 B2 | 2/2010 | Vokey et al. | |
| 7,674,188 B2 | 3/2010 | Ban | |
| 7,819,756 B2 | 10/2010 | Ban et al. | |
| 7,901,297 B2 * | 3/2011 | Ban | A63B 53/047 473/331 |
| 8,109,840 B2 | 2/2012 | Gilbert et al. | |
| 8,128,511 B2 * | 3/2012 | Golden | A63B 53/04 473/330 |
| 8,240,021 B2 | 8/2012 | Gilbert et al. | |
| 8,375,556 B2 | 2/2013 | Nakano | |

(Continued)

*Primary Examiner* — Nini Legesse
(74) *Attorney, Agent, or Firm* — Rebecca Hanovice; Michael Catania; Sonia Lari

(57) ABSTRACT

A cutting tool for simultaneously forming grooves and face surface features on the face of a golf club head, and methods of using said cutting tool, is disclosed herein. The tool preferably includes at least one groove cutting portion, which creates a groove having a sidewall angle, at least one radius cutting portion, which creates each groove's edge radii, and at least one face cutting portion, which flattens and/or textures the landing area disposed between each pair of grooves and is wider than the at least one groove cutting portion. The cutting tool of the present invention preferably spins around an axis parallel to the golf club face, and can include one or more micro-feature forming portions to create positive and/or negative texturing in the land areas between each pair of grooves.

13 Claims, 15 Drawing Sheets

(56) References Cited

U.S. PATENT DOCUMENTS

| | | | |
|---|---|---|---|
| 8,578,980 B2 | 11/2013 | Petersen et al. | |
| 8,834,291 B2 | 9/2014 | Ban | |
| 9,028,340 B2 * | 5/2015 | Ban | B23K 26/367 473/331 |
| 9,050,509 B2 * | 6/2015 | Jertson | A63B 53/04 |
| 9,216,329 B2 * | 12/2015 | Gilbert | A63B 53/04 |
| 2008/0132352 A1 * | 6/2008 | Ban | A63B 53/047 473/331 |
| 2009/0313806 A1 * | 12/2009 | Gilbert | A63B 53/04 29/527.6 |
| 2011/0269567 A1 | 11/2011 | Ban et al. | |
| 2011/0300967 A1 * | 12/2011 | Ban | A63B 53/047 473/331 |
| 2013/0225319 A1 * | 8/2013 | Kato | A63B 53/047 473/331 |
| 2013/0260912 A1 * | 10/2013 | Jertson | A63B 53/04 473/330 |
| 2014/0352391 A1 * | 12/2014 | Gilbert | A63B 53/04 72/352 |

* cited by examiner

GOLF CLUB HEAD WITH FACE GROOVES AND TEXTURING

CROSS REFERENCES TO RELATED APPLICATIONS

The present application claims priority to U.S. Provisional Patent Application No. 62/053,879, filed on Sep. 23, 2014, the disclosure of which is hereby incorporated by reference in its entirety herein.

STATEMENT REGARDING FEDERALLY SPONSORED RESEARCH OR DEVELOPMENT

Not Applicable

BACKGROUND OF THE INVENTION

Field of the Invention

The present invention relates to methods of simultaneously forming grooves in, and flattening and/or texturing, a golf club face, and golf club heads having faces with grooves and surface texturing. In particular, the present invention is directed to a process that simultaneously flattens a golf club face and adds grooves and natural and/or or post-finished micro-features using one cutting tool and a single-part machine setup.

Description of the Related Art

Grooves on golf club head faces, particularly iron-type golf clubs, allow the golfer to control the spin and launch angle of a golf ball upon impact with the face, and also help to channel debris away from the face of the golf club head. The prior art reveals many methods of forming grooves on faces, including the milling techniques taught in U.S. Pat. Nos. 7,273,422 and 8,578,980 and those used to create grooves in the Callaway Billet Series Entirely Milled Wedge sold in the late 1980s. In each of these examples, cutter 30 is used to form grooves 20 in the face 10, such that each groove 20 includes a lead-in radius 22 or edge geometry approved by the USGA, and is separated by a flat face portion 15, as shown in FIGS. 1 and 2. The cutter 30 turns at an axis 14 that is parallel to, or nearly parallel to, the face 10.

Generally, groove milling is preceded by fly-cutting the golf club face, an operation intended to ensure face flatness before grooves 10 are added. In this process, known as "vertical milling," a cutting tool 35 is oriented at an axis 12 that is perpendicular to the face 10, as shown in FIG. 3. Before the grooves 20 are added, manufacturers often purposely retain the machine marks in the face that may result from the face fly-cutting operation. These marks are meant to add texture to the face to improve spin control, as well as cosmetic appeal. As shown in prior art clubs such as the Callaway Billet Wedge, the fly-cutting tool 35 often leaves a distinctive rotary pattern on the face dependent upon the feeds and speeds, diameter, and the tip of the fly-cutter 35 used to flatten the face. These features are commonly referred to as micro-features or micro-grooves. These features can also be created in a third step, which may be performed before or after the grooves 20 are added, via laser, chemical milling, blasting, ablating, or other techniques known to a person skilled in the art.

The vertical milling operation typically is performed using a different set-up, technique, and/or machine than that used to form the face grooves 20, which can create golf club face 10 inconsistencies and unwanted marks. In fact, with these prior art techniques, maintaining consistency becomes time-consuming and costly, and must be performed by an experienced machinist or advanced technician. Without this experience, and the use of high precision tooling, these prior art techniques also do not provide a reliable way to control the edge deviation of each groove 20, such that higher performance (more steeply angled) grooves 20 are more likely to be nonconforming with USGA standards when they are formed using the prior art techniques described herein. Therefore, there is a need for a method of efficiently adding grooves and surface texturing to a golf club face without introducing inconsistencies or requiring a skilled technician to oversee production.

BRIEF SUMMARY OF THE INVENTION

The present invention is directed to novel methods of simplifying and improving the process of flattening a golf club face and adding grooves. The present invention is also directed to methods of creating unique golf club face patterns that include flat portions, micro-features, and grooves. The present invention is also directed to methods of improving the accuracy of groove and micro-feature formation in a golf club face, and of fine-tuning desired micro-groove geometry.

One aspect of the present invention is a cutting tool comprising at least one groove-forming portion and at least one face-flattening portion. Another aspect of the present invention is a face cutting tool comprising a groove-forming portion, a plurality of face-flattening portions, and at least one negative or positive micro-feature-forming portion. Yet another aspect of the present invention is a cutting tool comprising at least one groove-forming portion, at least one face-flattening portion, and at least one exit blend portion.

Another aspect of the present invention is a cutting tool for cutting into a golf club face, the cutting tool comprising at least one groove cutting portion, at least one radius cutting portion, and at least one face cutting portion, wherein the at least one face cutting portion is wider than the at least one groove cutting portion, and wherein the cutting tool spins around an axis parallel to the golf club face. In some embodiments, the at least one face cutting portion may comprise a first face cutting portion on one side of the groove forming portion and a second face cutting portion on the opposite side of the groove forming portion. In other embodiments, the cutting tool may comprise at least one micro-feature forming portion, which may be disposed on the at least one face cutting portion. In a further embodiment, the at least one micro-feature forming portion may be selected from the group consisting of a micro-feature forming nub and a micro-feature forming channel.

In other embodiments, the cutting tool may comprise at least four micro-feature forming nubs. In another embodiment, the cutting tool may comprise at least one micro-feature forming nub and at least one micro-feature forming channel. In yet another embodiment, the cutting tool may comprise at least one side edge having a shape selected from the group consisting of rounded and beveled. In another embodiment, the at least one groove forming portion may create a groove having a sidewall angle of less than 20 degrees, and more preferably a sidewall angle of approximately 5 degrees.

Yet another aspect of the present invention is a method comprising the steps of providing a tool comprising at least one groove forming portion, at least one radius forming portion, and at least one face cutting portion, providing an uncut golf club face, and cutting a plurality of grooves into the golf club face with the tool, wherein the cutting tool spins around an axis parallel to the golf club face, and wherein, during the step of cutting a plurality of grooves into the golf club face with the tool, the at least one face cutting portion cuts at least one third of a face landing area disposed between each pair of adjacent grooves. In some embodiments, the at least one face cutting portion may cut the entire landing area disposed between each pair of adjacent grooves. In other embodiments, during the step of cutting a plurality of grooves into the golf club face with the tool, the tool may be operated at a rate of 4000-7000 RPM and 10-25 IPM or more preferably at a rate of approximately 5200 RPM and 17 IPM. In an alternative embodiment, during the step of cutting a plurality of grooves into the golf club face with the tool, the tool 100 may be operated at a rate of 2500-4500 RPM and 25-65 IPM, or more preferably at a rate of approximately 3600 rpm and 43 IPM.

In yet another embodiment, during the step of cutting a plurality of grooves into the golf club face with the tool, the at least one face cutting portion may flatten at least a portion of the landing area disposed between each pair of adjacent grooves. In a further embodiment, the at least one face cutting portion may comprise at least one micro-feature forming portion, and, during the step of cutting a plurality of grooves into the golf club face with the tool, the at least one micro-feature forming portion may cut a texture into at least a portion of the landing area disposed between each pair of adjacent grooves. In a further embodiment, the at least one micro-feature forming portion may be a micro-feature forming channel that creates positive texturing on the golf club face. In another embodiment, during the step of cutting a plurality of grooves into the golf club face with the tool, a single pass of the tool across the golf club face may simultaneously cut at least two grooves into the golf club face and cut the landing area disposed between the at least two grooves.

Another aspect of the present invention is a golf club head, and more preferably an iron or wedge type golf club head, comprising a face with grooves formed using one or more of the methods described herein.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 4:
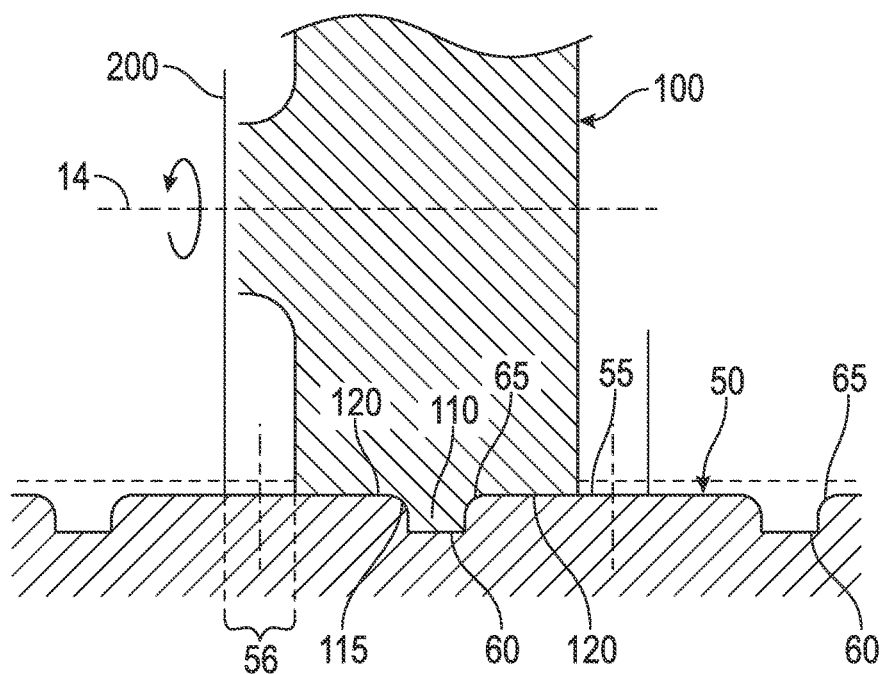
FIG. 4 is a cross-sectional view of a first embodiment of a cutting tool according to the present invention cutting a golf club face.

The present invention is directed to a method of using a single cutting tool 100 to cut, in a golf club face 50, a groove 60 with a lead-in radius 65 and to flatten or cut at least a portion of the landing area 55 between grooves 60 as well as generate micro-features, if desired. For example, FIG. 4 shows a first embodiment of a cutting tool 100 that includes a groove-forming portion 110, two radius-forming portions 115, and two face cutting portions 120 that flatten part of the landing area 55 of the face 50 during the cutting process. In a single pass, this tool 100 cuts the groove 60 and approximately one third of the landing area 55 on either side of the groove 60 into the face 50. The tool 100 spins around an axis 14 parallel to the face 50 and, when the manufacturer has finished cutting grooves 60 into the face 50, a middle portion 56 of each landing area 55 remains uncut.

Figure 5:
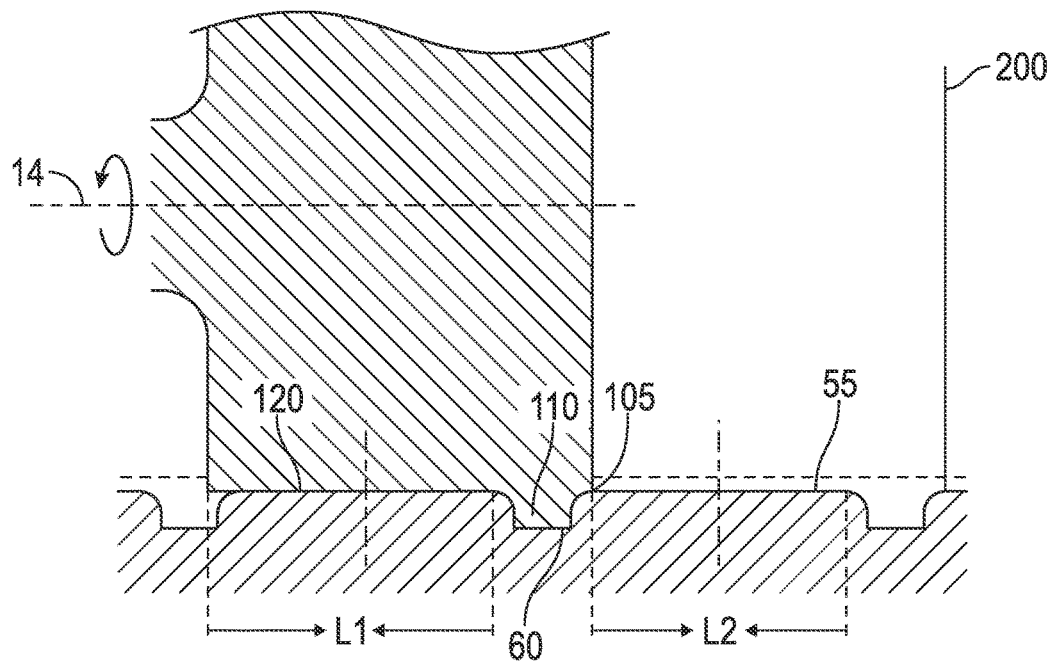
FIG. 5 is a cross-sectional view of a second embodiment of a cutting tool according to the present invention cutting a golf club face.
Figure 6:
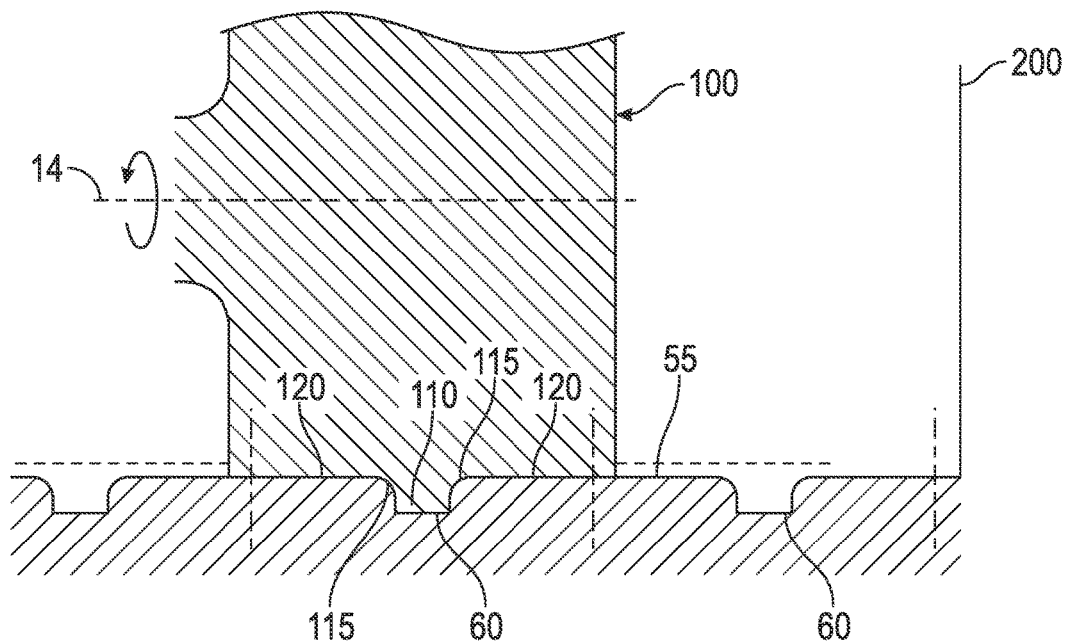
FIG. 6 is a cross-sectional view of a third embodiment of a cutting tool according to the present invention cutting a golf club face.

In another embodiment, shown in FIG. 5, the cutting tool 100 includes some of the same features as shown in FIG. 4, except that the groove-forming portion 110 and one of the radius-forming portions 115 is disposed at a terminal edge 105 of the cutting tool 100, and a single face cutting portion 120 has a length L1 that is greater than the length of the landing area 55 of the face 50 L2. This cutting tool 100 allows a manufacturer to cut a groove 60 and flatten the entire landing area 55 with a single pass of the tool 100. In a similar embodiment, shown in FIG. 6, the groove forming portion 110 and the radius-forming portions 115 of the cutting tool 100 are disposed at the center of the tool 100, and the face cutting portions 120 cut one half of the landing area 55 on each side of the groove during a single pass. When all of the grooves 60 are cut into the face 50, this cutting tool 100 ensures that all landing areas 55 have been flattened.

Figure 7:
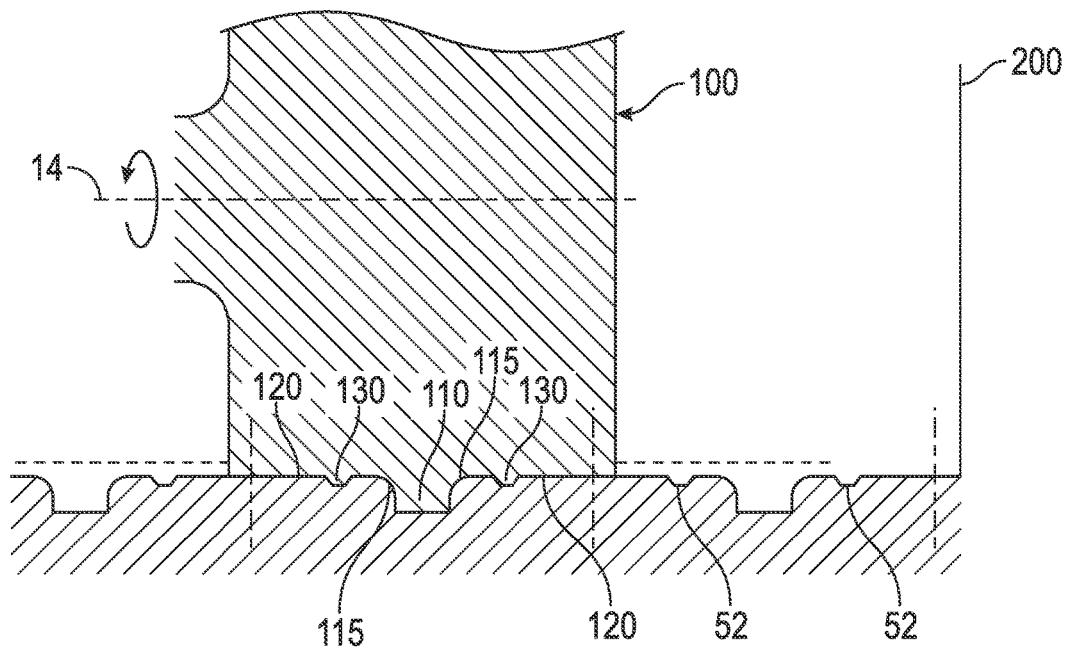
FIG. 7 is a cross-sectional view of a fourth embodiment of a cutting tool according to the present invention cutting a golf club face.
Figure 8:
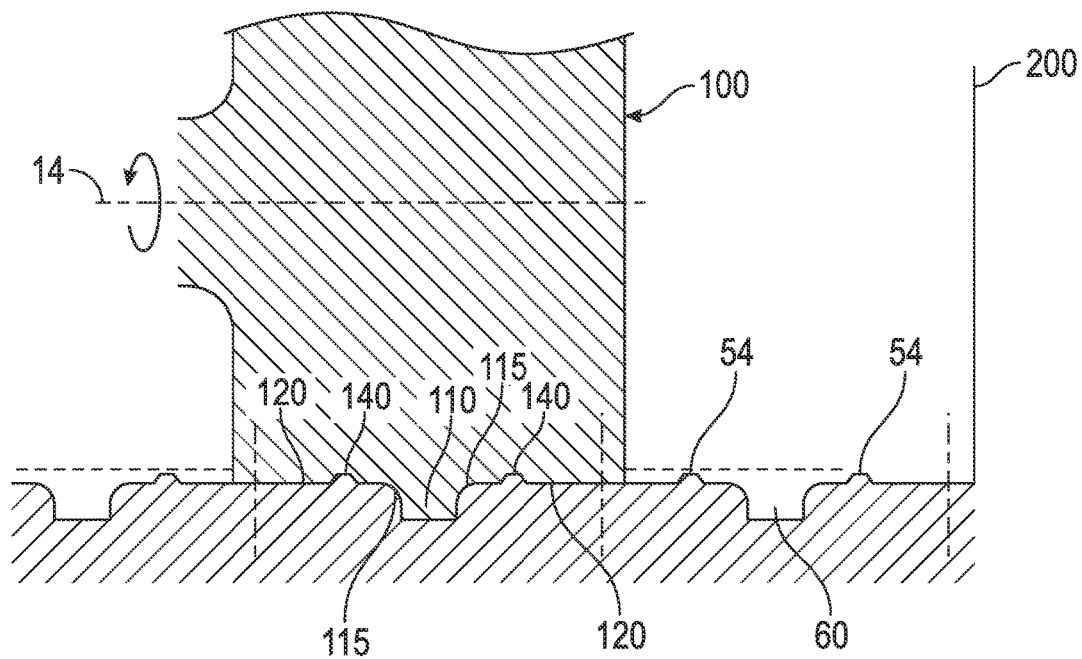
FIG. 8 is a cross-sectional view of a fifth embodiment of a cutting tool according to the present invention cutting a golf club face.

The novel cutting tool of the present invention also provides manufacturers with the opportunity to create either 'positive' or 'negative' micro-features in a golf club face at the same time as groove formation and face cutting. For example, in the embodiment shown in FIG. 7, the cutting tool 100 has all of the features of the embodiment shown in FIG. 6, and further includes micro-feature-forming nubs 130 that create negative texturing 52, also known as micro-grooves or traces, in the landing area 55 of the face 50. In the preferred embodiment shown in FIG. 8, the cutting tool 100 has all of the features of the embodiment shown in FIG. 6, and further includes micro-feature-forming channels 140 that create positive texturing 54, or raised edges, in the landing area 55 of the face 50. This is particularly beneficial because the prior art, post-groove cutting micro-feature methods such as laser marking and cutting only allow for the creation of negative micro-features.

Figure 11:
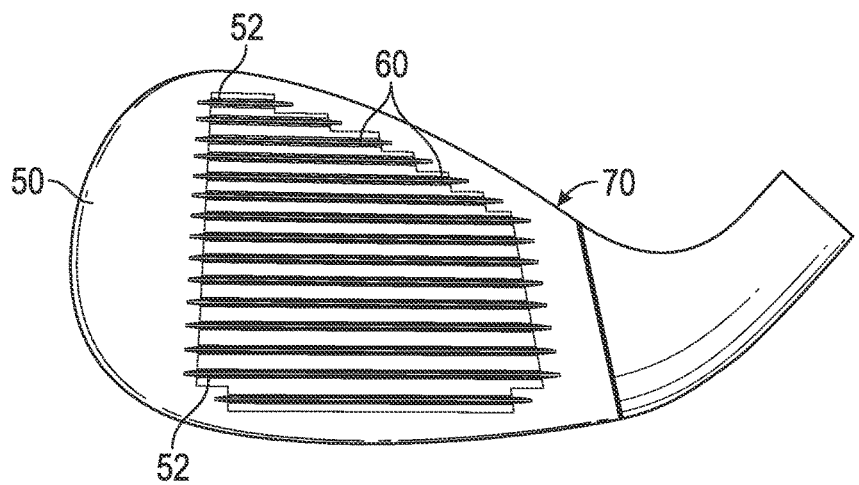
FIG. 11 is a front perspective view of a golf club head with face texturing created using a tool with multiple micro-feature forming nubs.
Figure 12:
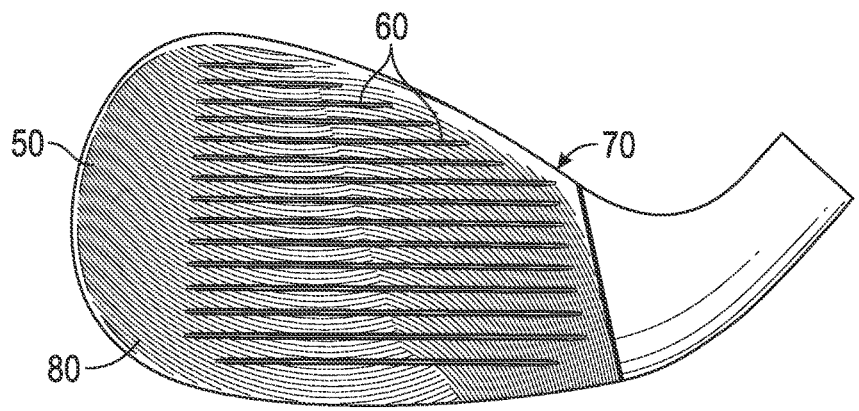
FIG. 12 is a front perspective view of a golf club head with face texturing created using one of the tools shown in FIGS. 4-6 and 9.
Figure 13:
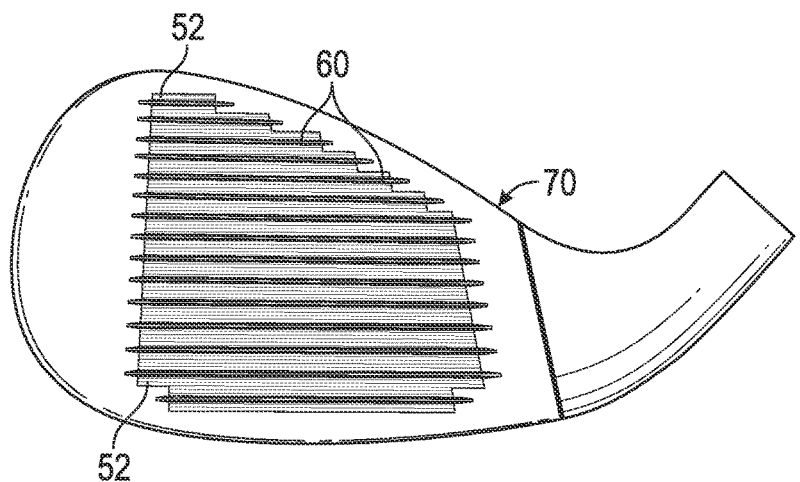
FIG. 13 is a front perspective view of a golf club head with face texturing created using a tool with multiple micro-feature forming nubs.
Figure 14:
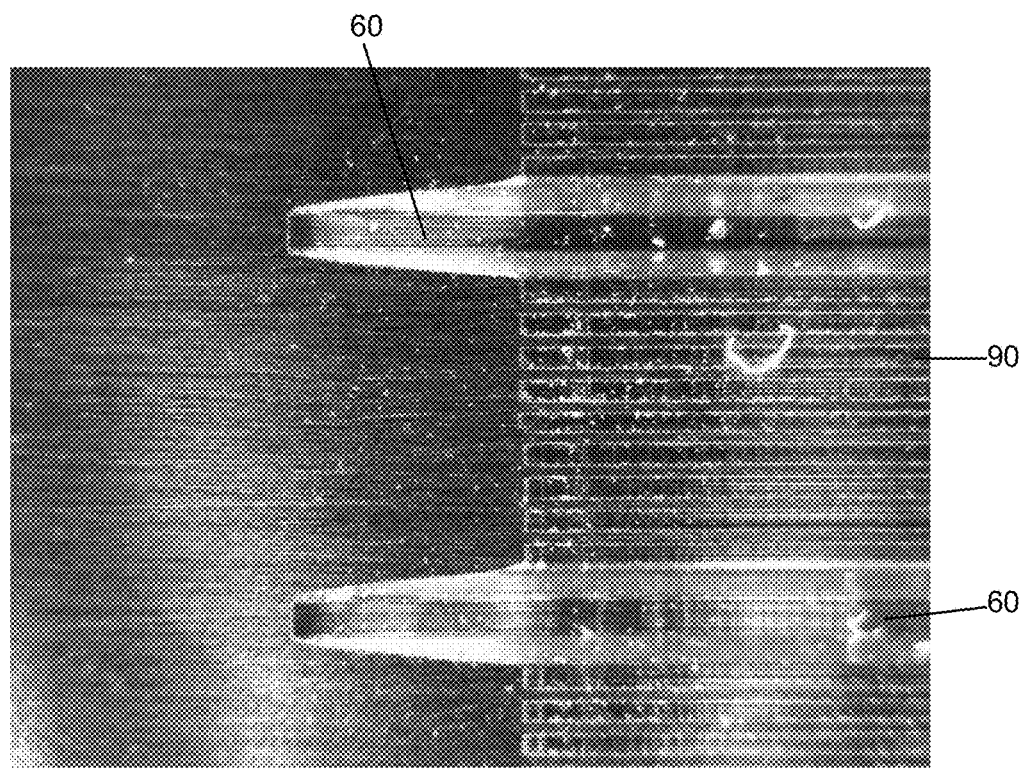
FIGS. 14-27 are photographs of golf club faces with different surface textures created using variations of the cutting tool embodiments disclosed herein.
Figure 15:
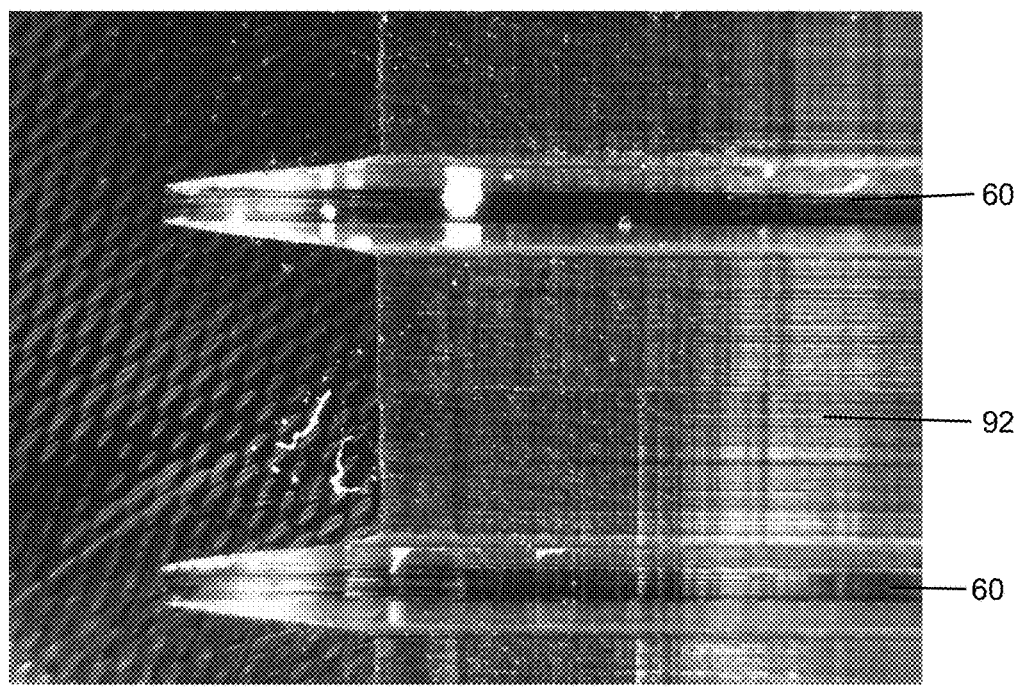

In another embodiment, the cutting tool 100 may include both micro-feature forming nubs 130 and channels 140. In still other embodiments, the cutting tool 100 may include a plurality of micro-feature forming nubs 130 and/or channels 140 to create face patterns such as those of the golf clubs 70 illustrated in FIGS. 11 and 13, and the face patterns illustrated in FIGS. 14-17, 23, 25 and 26. Micro-features can also be added as a secondary operation after the tool 100 is used if a manufacturer requires different processing, patterns, or looks for the golf club face 50. For example, as shown in FIG. 12, the golf club face 50 may be cut and grooved using one of the tools shown in FIGS. 4-6 and 9, and then the face can be machined, laser marked, etched, etc., to add curved micro-features 80 that are not parallel to the grooves 60.

Figure 9:
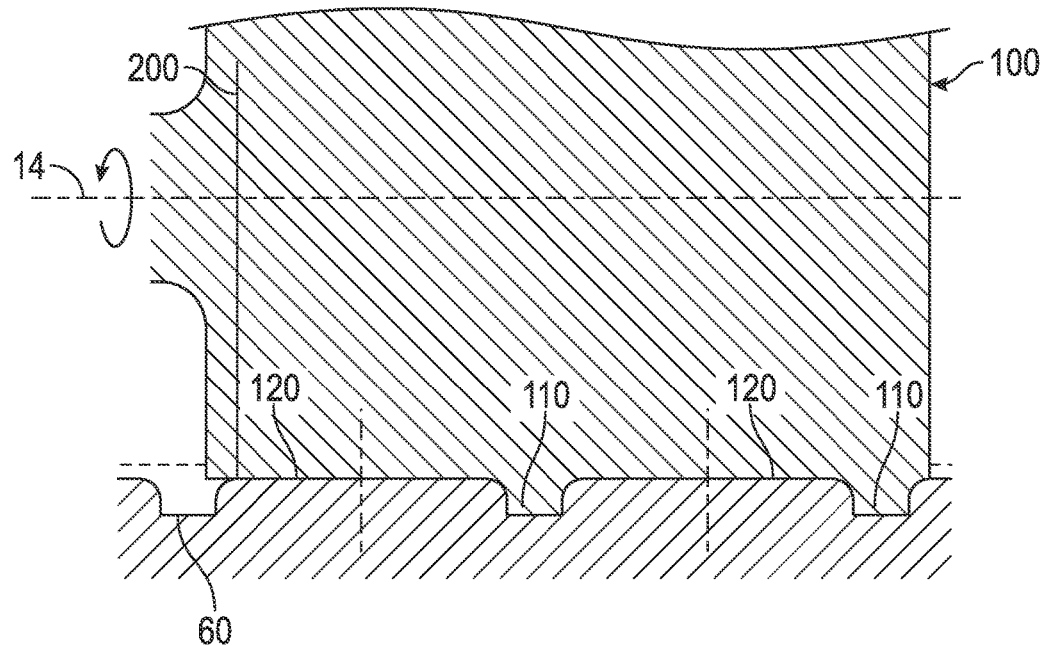
FIG. 9 is a cross-sectional view of a sixth embodiment of a cutting tool according to the present invention cutting a golf club face.

As shown in FIG. 9, the inventive tool 100 also makes it possible for a manufacturer to cut two or more, or all, required grooves 60 into a golf club face 50 in one pass. In the embodiment shown in FIG. 9, the tool 100 includes two groove-forming portions 110 and two complete face cutting portions 120. This cutting tool 100 improves both the accuracy and the speed of the groove cutting process.

The inventive cutting tool 100 of the present invention can also include edge features that accommodate different blend or exit options for the tool 100, depending on how much of the face 50 a manufacturer wishes to cut and whether the tool 100 path will overlap at each pass. The lighter lines 200 included in each of FIGS. 1 and 4-9 herein illustrate the previous and subsequent locations of the tool 100 shown in those Figures before and after the face features the cutting tool 30, 100 is shown to be creating are completed, and show how the tool path may overlap at each pass.

Figure 10A:
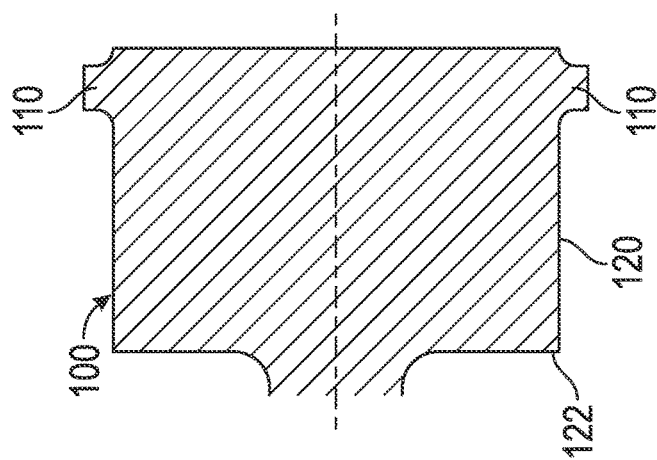
FIGS. 10A-10C are cross-sectional views of the tool shown in FIG. 5 and two other embodiments of a cutting tool, each with different side edge exit shapes.
Figure 10B:
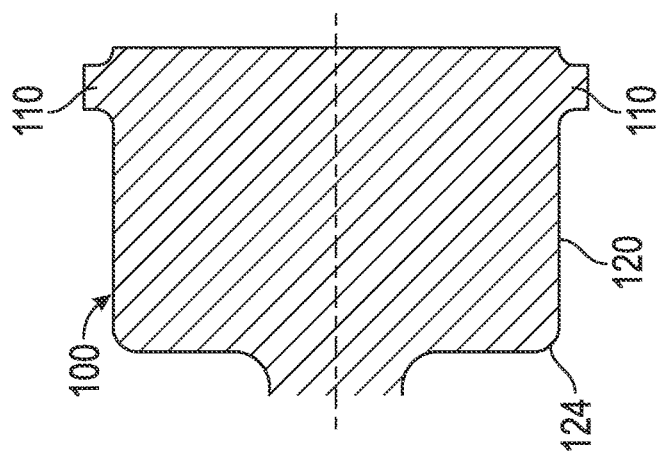
Figure 10C:
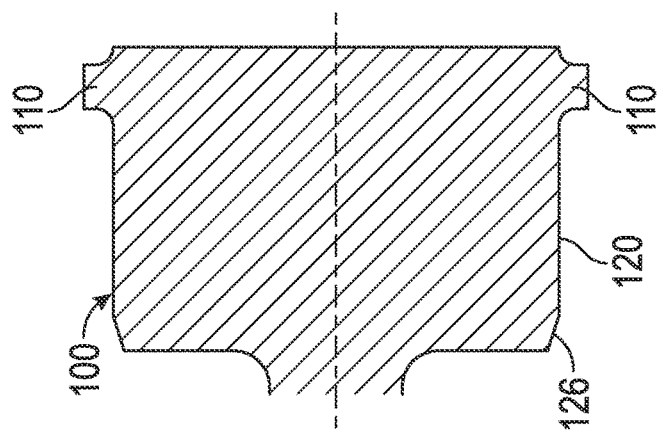
Figure 24:
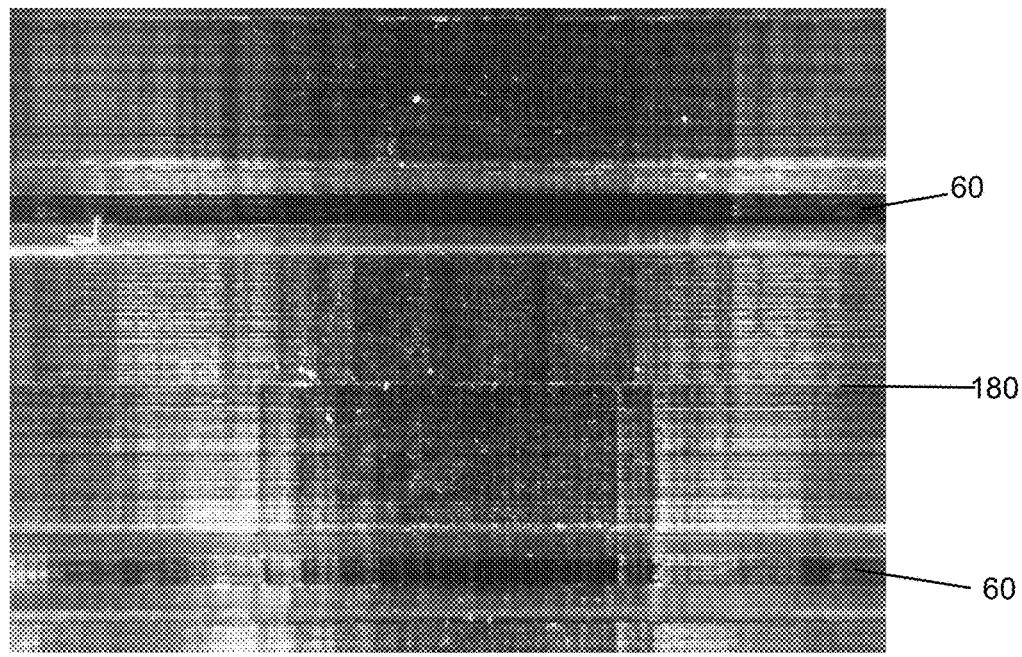
Figure 25:
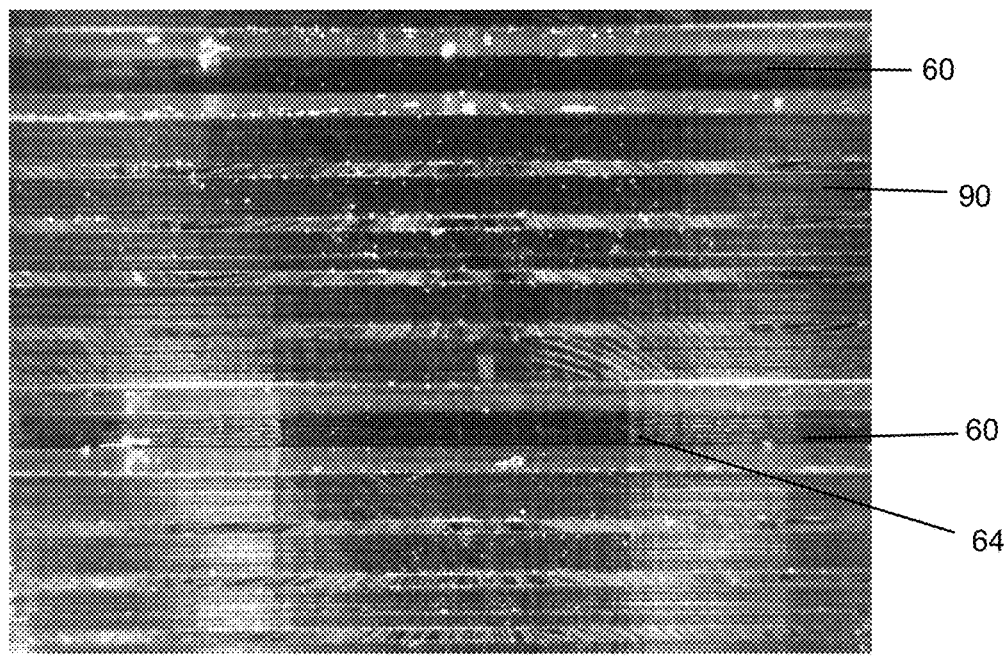
Figure 26:
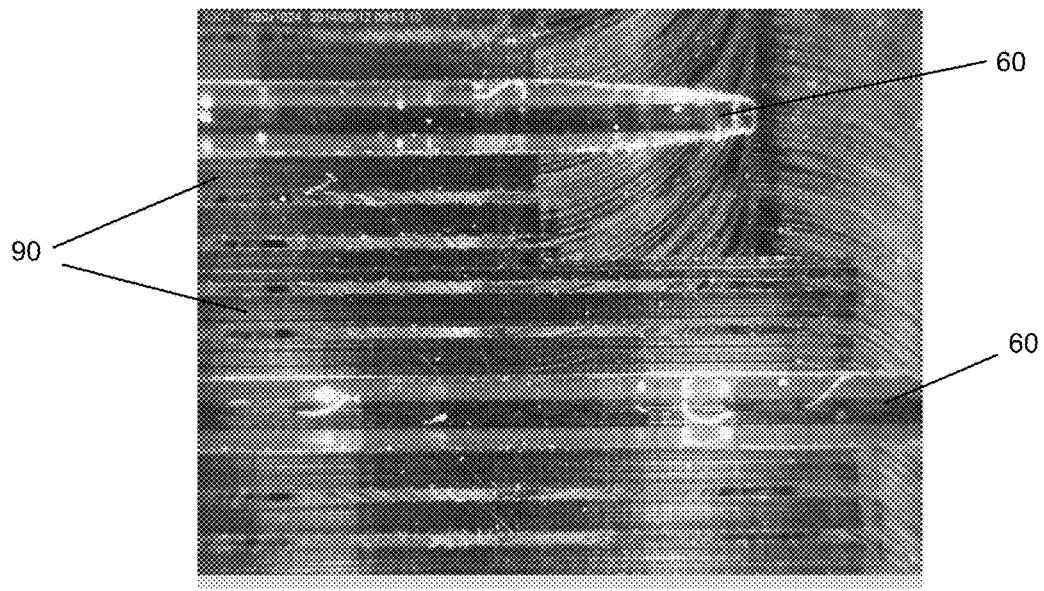
Figure 27:
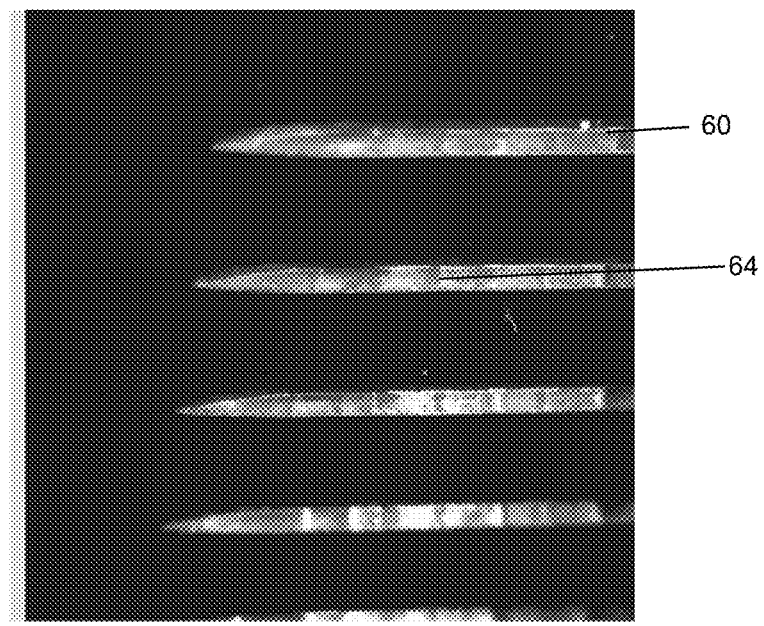

As illustrated in FIGS. 10A-10C, the tool 100 may have a sharp, ninety degree side edge 122, a rounded side edge 124, or a beveled side edge 126, as desired by the manufacturer. The shape of the side edges 122, 124, 126 determine groove overlap effects. In fact, they affect the texturing of the overlap area created when the cutting tool 100 is moved to a new location on the face 50 as shown in FIG. 24, in which an overlap line 180 is visible in the landing area 55 between the grooves 60. The shape of the side edges 122, 124, 126 becomes even more important when the groove-forming portion 110 is disposed in the middle region of the tool. In this case, there will be overlap on both sides of the tool 100 when it is moved from one position on the face 50 to another, and if misalignment occurs when the tool 100 is moved, the shape of the side edge 122, 124, 126 determines whether there will be a sharp edge at the overlap region, or if the overlap region will have a blended appearance.

Figure 16:
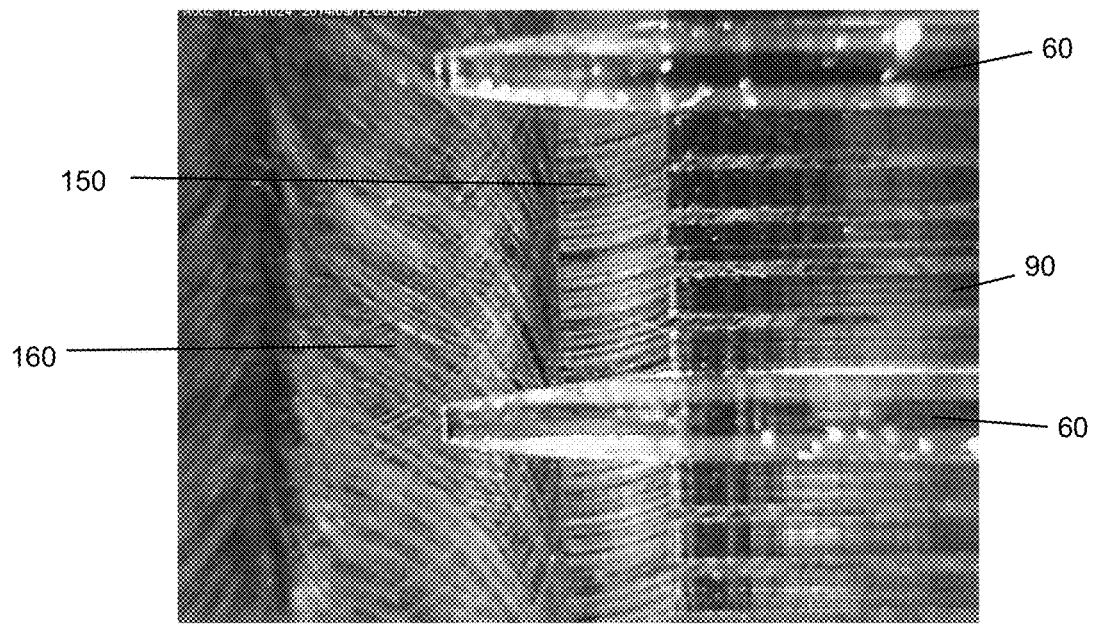
Figure 17:
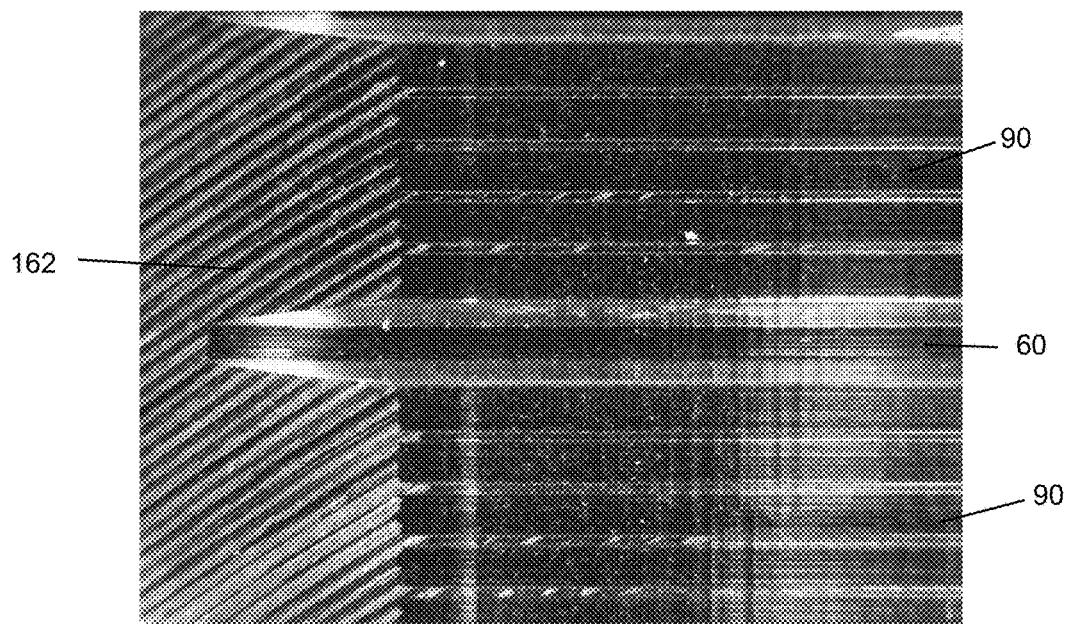
Figure 18:
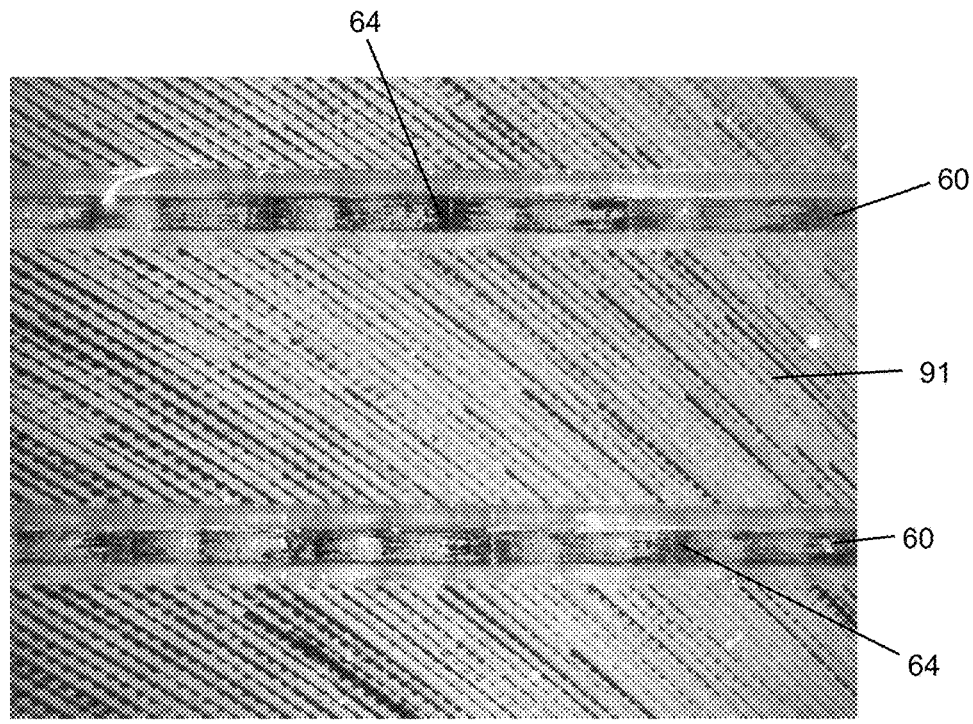
Figure 19:
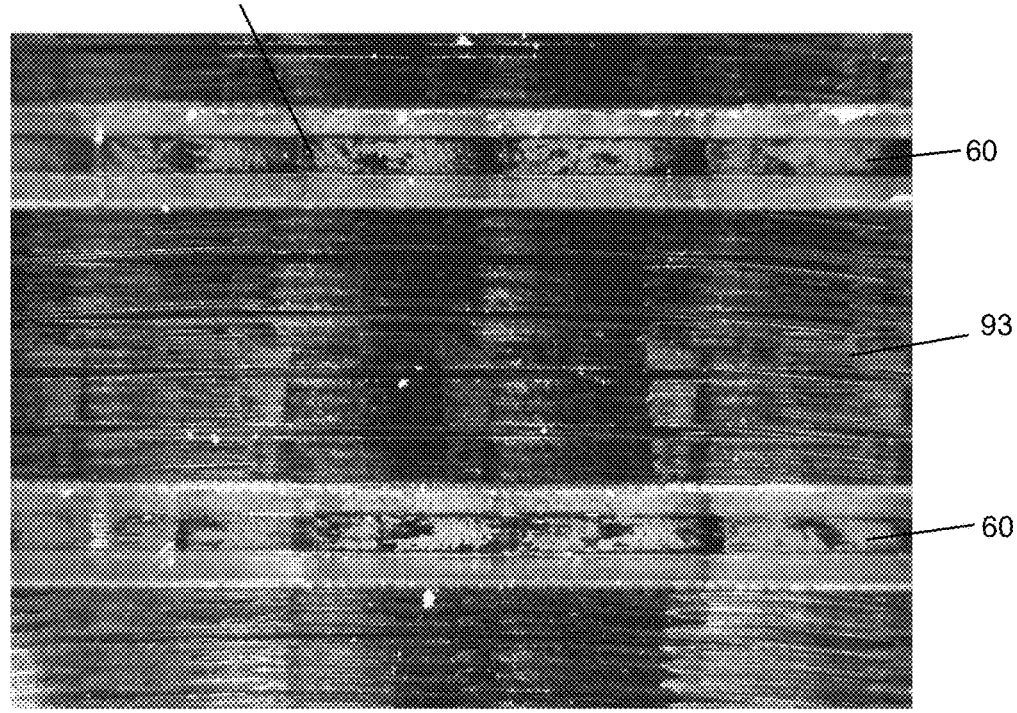
Figure 20:
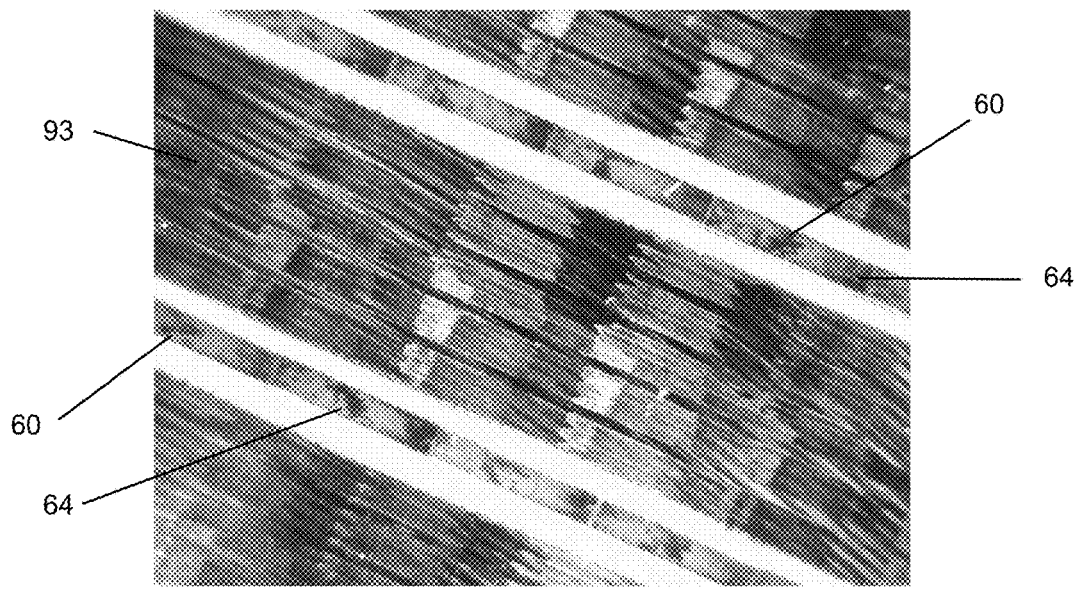
Figure 21:
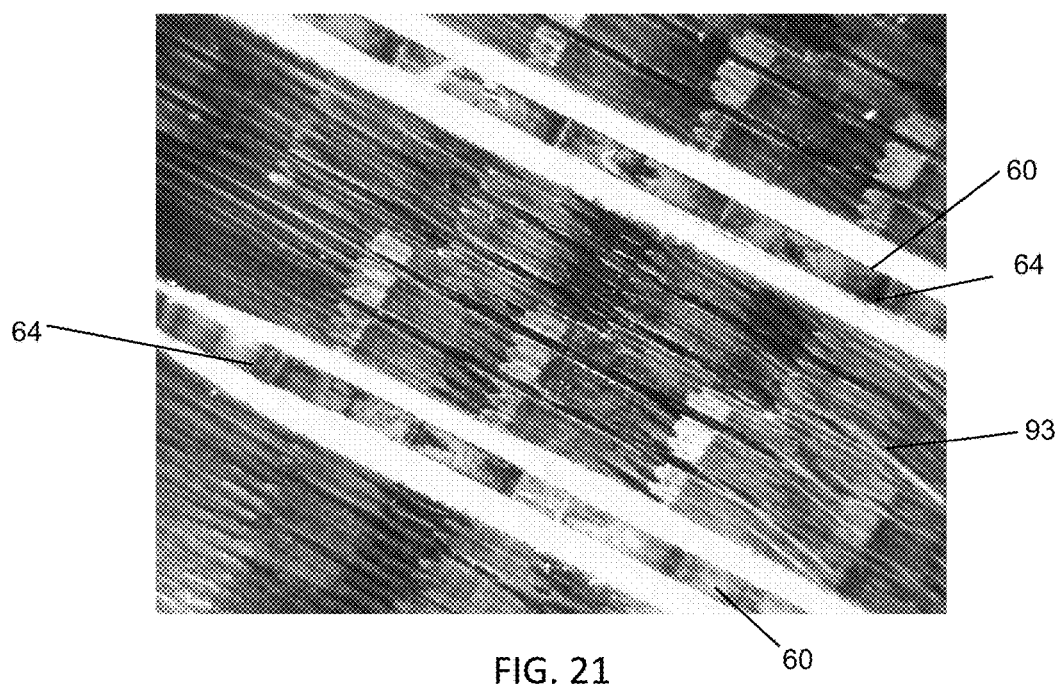
Figure 22:
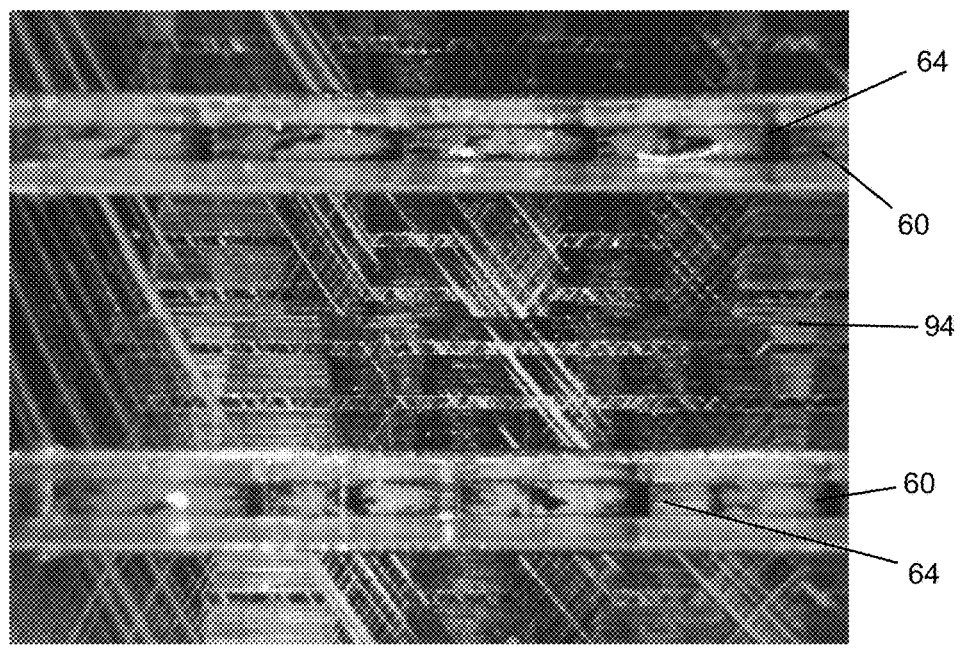
Figure 23:
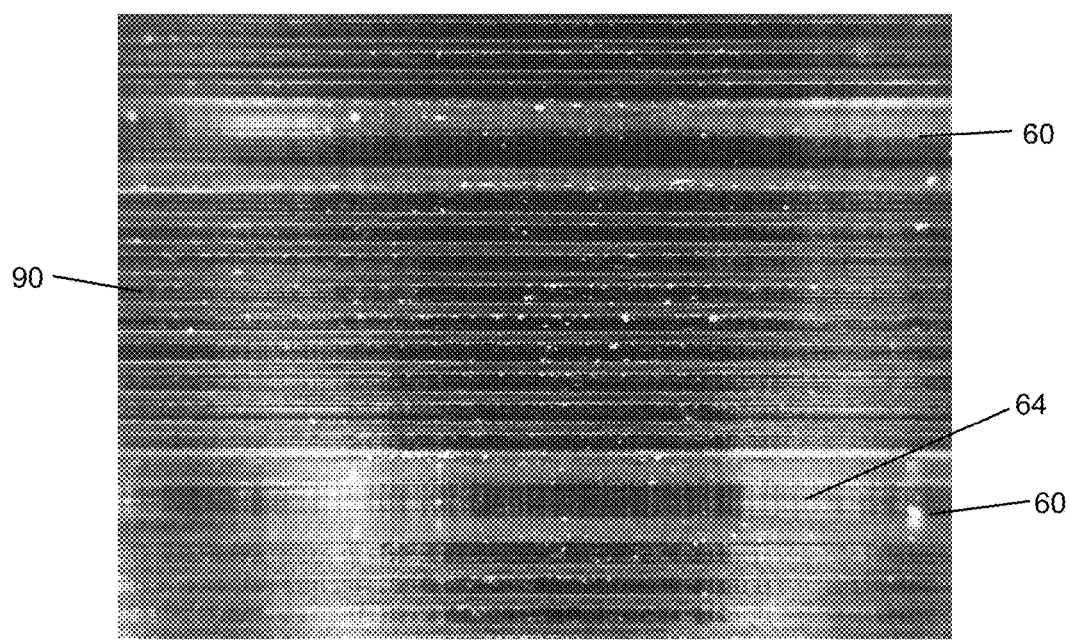

Cutting a golf club face using one or more of the tools disclosed herein, or variations thereof, produces unique surface finish appearances, as shown in FIGS. 11-27. These unique surface finishes can be altered by changing the feeds and speeds of the cutting process, and by altering the diameter and other geometry of the tooling being used. For example, the face 50 shown in FIG. 14 includes eight or nine micro-feature lines 90 disposed between one or more pair of grooves 60, while the face 50 shown in FIG. 15 includes substrate texture contrast 92 between one or more pairs of grooves 60. In FIG. 16, the face 50 includes four to five micro-feature lines 90 disposed between one or more pair of grooves 60 and end and tool exit texturing 150, while in FIG. 17, the face 50 just includes the four to five micro-feature lines 90 between one or more pair of grooves 60. In each of these examples, the face 50 includes texturing 160, 162 disposed outside of the groove 60 region as well.

In the examples shown in FIGS. 18-23, 25, and 27, the grooves 60 themselves have internal texturing 64 created by the groove-forming portion 110. When the speed of the tool 100 as it moves across the face 50, also called the feed rate, is low but has a high number of revolutions per minute (RPM), the internal surface of the grooves 60 looks smoother. When the tool 100 has a high feed rate with a low RPM, the tool 100 adds texturing or otherwise roughens the internal surface of the grooves 60. In general, it is desirable to have the high feed rate and low RPM combination in order to increase the overall roughness of the face 50 and improve its performance, but having a low feed rate and high RPM combination provides an aesthetically pleasing surface texturing. When the golf club face 50 is composed of 1020 carbon steel, the tool 100 preferably is operated at a rate of 4000-7000 RPM and 10-25 inches per minute (IPM), and more preferably at 5200 RPM and 17 IPM. When the golf club face 50 is composed of 17-4 stainless steel, the tool 100 preferably is operated at a rate of 2500-4500 RPM and 25-65 IPM, and more preferably at 3600 rpm and 43 IPM.

The examples shown in these Figures also include micro-features such as angled lines 91 (FIG. 18), interrupted texturing 93 (FIGS. 19-21), partially interrupted texturing 94 (FIG. 22), and micro-feature lines 90 (FIGS. 23 and 25) disposed between one or more pair of grooves 60. In some cases the unique surface finishes may be highlighted in the final product, while in other cases, the finish may be covered or made to look less unique if a golfer finds it to be distracting.

One of the many benefits of the processing methods using the tools disclosed herein is increased control over the grooves' edge deviation ("ED"), and thus a higher rate of USGA conformance of grooves cut using the inventive processing methods. According to the USGA Rules of Golf, "groove edges must be substantially in the form of a round having an effective radius which is not less than 0.010 inches (0.254 mm) . . . and not greater than 0.020 inches (0.508 mm). Deviations in effective radius within 0.001 inches (0.0254 mm) are permissible." http://www.usga.org/bookrule.aspx?id=14323. The rule also allows for 50% or less of the upper ED measurements, or 50% or less of the lower ED measurements, of grooves on a club face to be up to 0.0113 inch. A single ED over 0.0113 inch, however, will render a golf club non-conforming.

Figure 1:
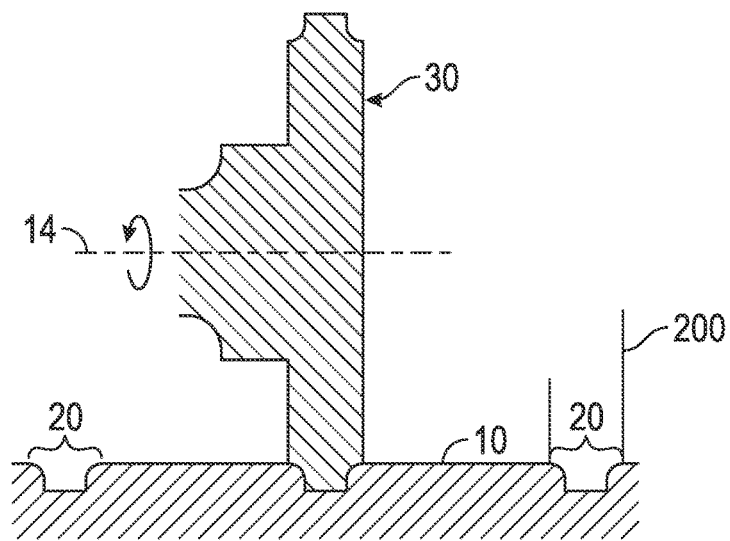
FIG. 1 is a cross-sectional view of a prior art groove cutting tool cutting a golf club face.
Figure 2:
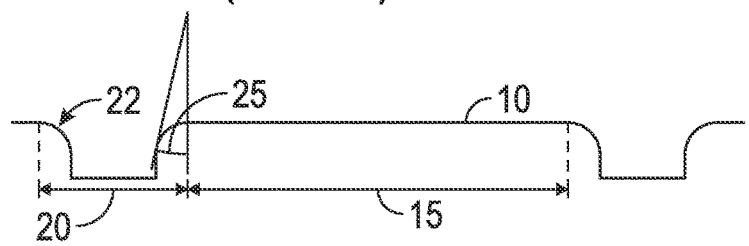
FIG. 2 is a cross-sectional view of the face shown in FIG. 1 after the prior art cutting tool has finished cutting it.
Figure 3:
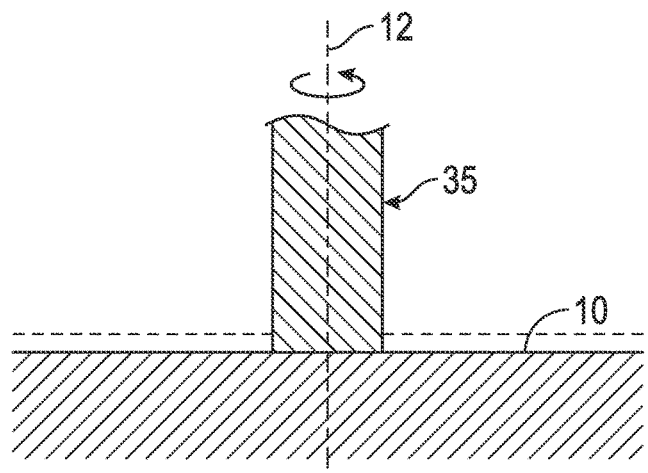
FIG. 3 is a cross-sectional view of a prior-art fly-cutting tool cutting a golf club face.
Figure 28:
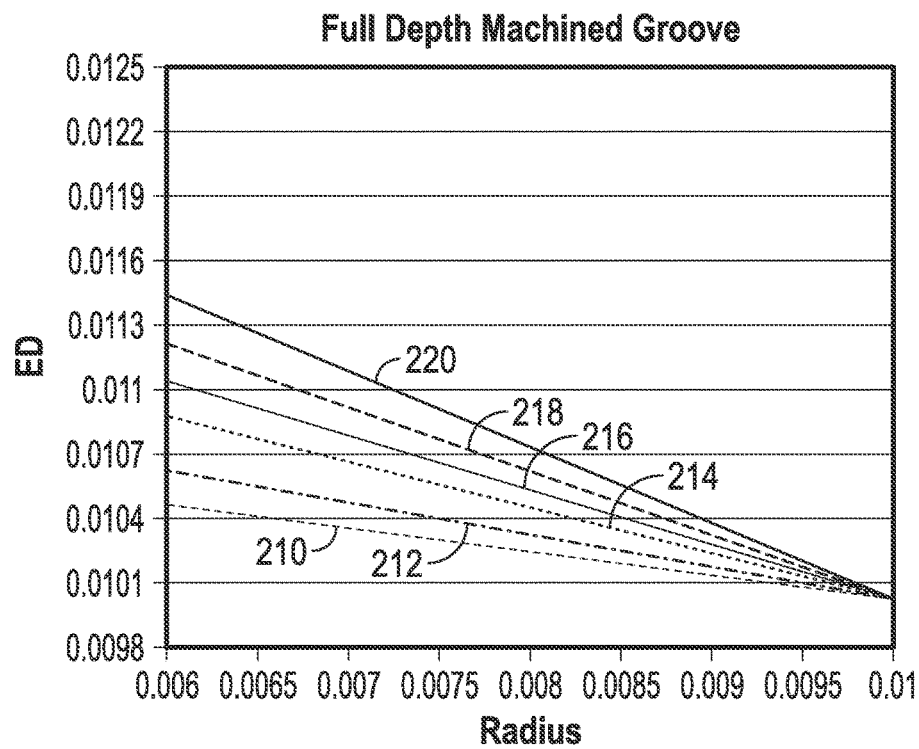
FIG. 28 is a graph showing the relationship between the edge deviation and edge radius of grooves having a range of different sidewall angles.
Figure 29:
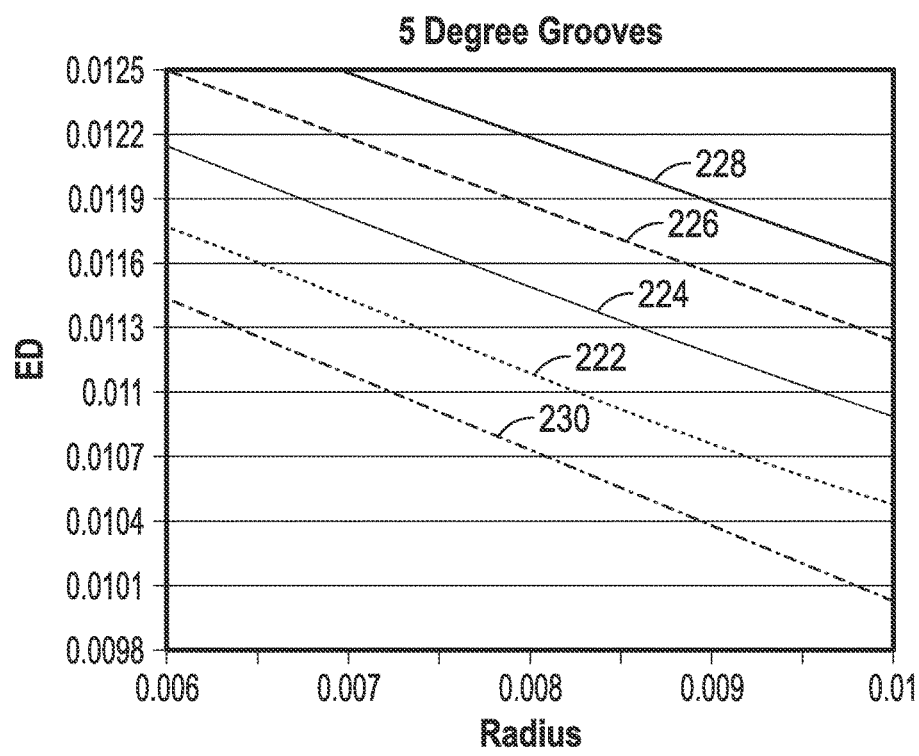
FIG. 29 is a graph showing the relationship between the edge deviation and edge radius for 5 degree grooves of varying depths.
Figure 30:
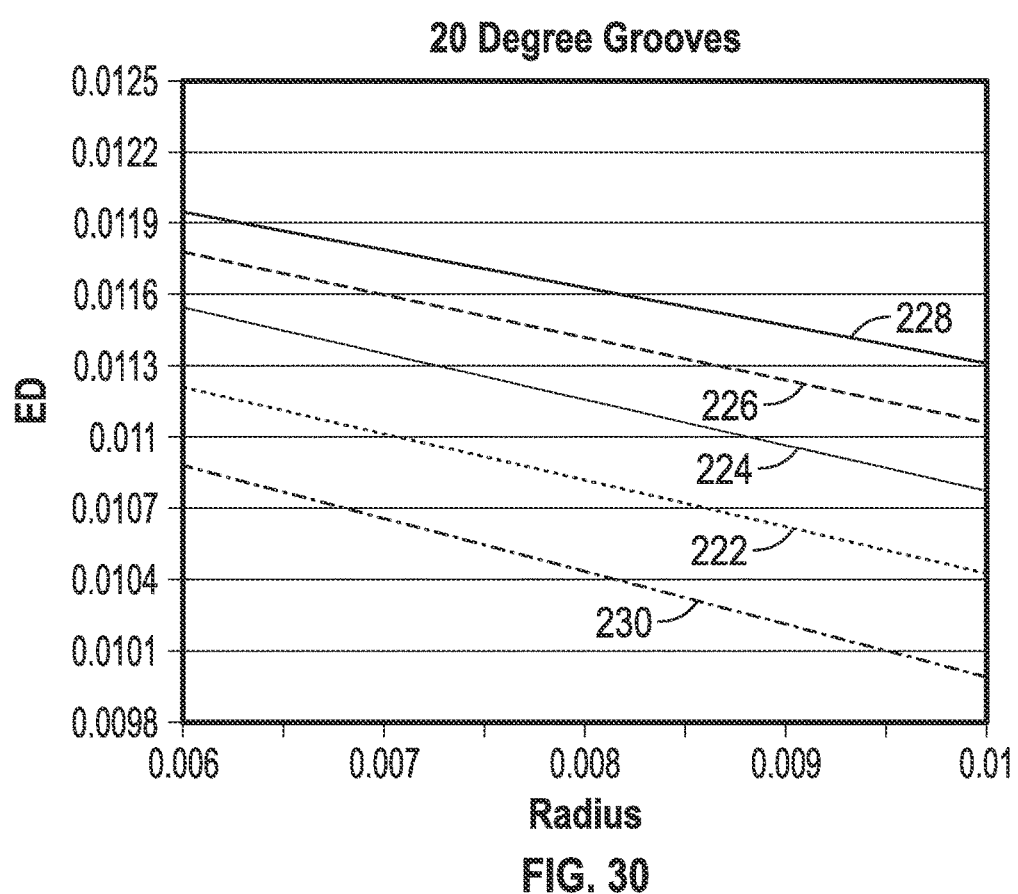
FIG. 30 is a graph showing the relationship between the edge deviation and edge radius for 20 degree grooves of varying depths.

As shown in FIG. 28, the sensitivity of a groove's ED based on that groove's radius increases as the angle 25 of the groove sidewall (see FIG. 2) becomes steeper (e.g., 37 degrees 210, 30 degrees 212, 20 degrees 214, 15 degrees 216, 10 degrees 218, and 5 degrees 220). The 5 degree groove 220 is the most difficult to create in a conforming manner, but also creates the highest spin in a golf ball and thus is very desirable to manufacturers and golfers alike. As shown in FIG. 29, a 5 degree groove 220 can quickly develop a non-conforming ED if the groove's full depth 230 is not maintained throughout the machining process, e.g., if it changes across the groove (0.0005 inch 222, 0.001 inch 224, 0.0015 inch 226, and 0.002 inch 228). For example, if the 5 degree groove has a radius of 0.008 inch, the ED at the groove's full depth falls well within USGA conformance levels. At a shallower cut of 0.0005 inch, however, the ED becomes non-conforming. This problem is not as severe with more conservative groove slopes, such as the 20 degree groove 214, but as shown in FIG. 30, the problem still exists.

These ED problems implicate tool design, e.g., how tightly the groove radius on the cutter must be controlled, and how close to the USGA ED limit the tools can be. Prior art vertical milling groove forming processes often involve the use of tip followers, which allow manufacturers to maintain a fairly consistent groove depth but also require additional time and effort to use. This option is not available for the prior art horizontal milling processes, which require an even higher level of precision in machining and consistent fixturing between fly cutting processes and groove milling processes. The inventive processing methods disclosed herein solve these problems because the landing area between the grooves is machined at the same time as the grooves, thus the depth variation that was dependent on set up and accuracy of previous operations is eliminated, the geometry of the grooves depend only on the geometry of the cutter, and full depth grooves without significant variations will be guaranteed.

In fact, face processing methods that utilize any of the cutting tools 100 disclosed herein eliminate the need for a high tolerance set-up operation between fly-cutting and groove cutting processes, and therefore are less labor-intensive, less costly to set up, and far more robust for production purposes than prior art techniques. Furthermore, the combination of face flattening, groove cutting, and micro-feature addition processes is unique for a face cutting operation because the micro-features run parallel to the score lines, unlike prior art fly-cut, vertically milled micro-features. The simultaneously cut micro-features may be full length, or may be cut with a skip-tooth tool, such that the features start and stop at regular intervals. There is an added benefit in creating micro-features using this method because their spacing and positioning relative to the score line pattern will be extremely accurate without requiring a complicated operational set-up.

In an alternative embodiment, a tool 100 having micro-feature-forming nubs or channels 130, 140 but no groove-forming portions 110 may be used to cut micro-features into a club face 50 at an angle that is nonparallel with the grooves themselves. The grooves 60 can then be milled or otherwise added to the face 50. If this process is performed using a tool 100 that creates positive micro-features, and the edge of the tool 100 is carefully managed when the grooves 60 are added, the edge deviations of the grooves 60 will not be affected by the positive features. If this process is performed with a tool 100 that creates negative micro-features, the edges of grooves 60 added later will have edge radii that include some of the negative micro-features as they fade out onto the face 50.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention:

1. A cutting tool for cutting into a golf club face, the cutting tool comprising:
    a first groove cutting portion;
    a second groove cutting portion;
    at least one radius cutting portion;
    at least one micro-feature forming portion;
    a first face cutting portion disposed between the first and second groove cutting portions; and
    a second face cutting portion,
    wherein the at least one micro-feature forming portion is disposed on the first face cutting portion,
    wherein each of the first and second face cutting portions is wider than each of the first and second groove cutting portions,
    wherein the first face cutting portion extends approximately perpendicular to the first and second groove cutting portions,
    wherein the at least one micro-feature forming portion has a depth that is less than a depth of the first groove cutting portion, and
    wherein the cutting tool spins around an axis parallel to the golf club face.

2. The cutting tool of claim 1, wherein the at least one micro-feature forming portion comprises at least four micro-feature forming nubs.

3. The cutting tool of claim 1, wherein the at least one micro-feature forming portion comprises at least one micro-feature forming nub and at least one micro-feature forming channel.

4. The cutting tool of claim 1, further comprising at least one side edge having a shape selected from the group consisting of rounded and beveled.

5. A method comprising the steps of:
    providing a tool comprising first groove forming portion, a second groove forming portion, at least one radius forming portion, and a first face cutting portion disposed between the first and second groove forming portions, the first face cutting portion having a width that is greater than that of each of the first and second groove forming portions,
    providing an uncut golf club face, and
    cutting a plurality of grooves into the golf club face with the tool,
    wherein the cutting tool spins around an axis parallel to the golf club face,
    wherein, during the step of cutting a plurality of grooves into the golf club face with the tool, the first face cutting portion cuts an entire face landing area disposed between each pair of adjacent grooves, and
    wherein the first face cutting portion extends approximately perpendicular to the first and second groove forming portions.

6. The method of claim 5, wherein, during the step of cutting a plurality of grooves into the golf club face with the tool, the tool is operated at a rate of 4000-7000 RPM and 10-25 IPM.

7. The method of claim 6, wherein the tool is operated at a rate of approximately 5200 RPM and 17 IPM.

8. The method of claim 5, wherein, during the step of cutting a plurality of grooves into the golf club face with the tool, the tool 100 is operated at a rate of 2500-4500 RPM and 25-65 IPM.

9. The method of claim 8, wherein the tool is operated at a rate of approximately 3600 rpm and 43 IPM.

10. The method of claim 5, wherein, during the step of cutting a plurality of grooves into the golf club face with the tool, the first face cutting portion flattens at least a portion of the face landing area disposed between each pair of adjacent grooves.

11. The method of claim 10, wherein the first face cutting portion comprises at least one micro-feature forming portion, and wherein, during the step of cutting a plurality of grooves into the golf club face with the tool, the at least one micro-feature forming portion cuts a texture into at least a portion of the landing area disposed between each pair of adjacent grooves.

12. The method of claim 11, wherein the at least one micro-feature forming portion is a micro-feature forming channel that creates positive texturing on the golf club face.

13. An iron-type golf club head comprising a face with grooves formed using the method of claim 5.

\* \* \* \* \*